US008016898B1

(12) United States Patent
Lange et al.

(10) Patent No.: US 8,016,898 B1
(45) Date of Patent: *Sep. 13, 2011

(54) METHOD FOR PRODUCING MANNICH ADDUCTS THAT CONTAIN POLYISOBUTYLENE PHENOL

(75) Inventors: Arno Lange, Bad Dürkheim (DE); Hans Peter Rath, Grünstadt (DE); Dietmar Posselt, Heidelberg (DE); Irene Trötsch-Schaller, Bissersheim (DE); Marc Walter, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 431 days.

This patent is subject to a terminal disclaimer.

(21) Appl. No.: 10/089,056

(22) PCT Filed: Oct. 5, 2000

(86) PCT No.: PCT/EP00/09745
§ 371 (c)(1),
(2), (4) Date: Apr. 3, 2002

(87) PCT Pub. No.: WO01/25293
PCT Pub. Date: Apr. 12, 2001

(30) Foreign Application Priority Data

Oct. 6, 1999 (DE) .................................. 199 48 114

(51) Int. Cl.
*C10L 1/22* (2006.01)
(52) U.S. Cl. ........... 44/415; 508/582; 564/367; 564/368
(58) Field of Classification Search .................... 44/415; 508/542; 564/367, 368
See application file for complete search history.

(56) References Cited

U.S. PATENT DOCUMENTS

| 3,413,347 | A | * | 11/1968 | Worrel | 564/367 |
| 3,904,595 | A | * | 9/1975 | Plonsker et al. | 544/158 |
| 3,948,619 | A | * | 4/1976 | Worrel | 44/415 |
| 4,231,759 | A | | 11/1980 | Udelhofen | |
| 5,300,701 | A | | 4/1994 | Cherpeck | |
| 5,634,951 | A | * | 6/1997 | Colucci et al. | 44/415 |
| 5,697,988 | A | | 12/1997 | Malfer et al. | |
| 5,725,612 | A | * | 3/1998 | Malfer et al. | 44/415 |
| 5,876,468 | A | * | 3/1999 | Moreton | 44/415 |
| 6,458,172 | B1 | | 10/2002 | Macduff et al. | |
| 6,562,913 | B1 | * | 5/2003 | Baxter et al. | 526/64 |
| 6,800,103 | B2 | | 10/2004 | Malfer et al. | |
| 2003/0056431 | A1 | | 3/2003 | Schwab et al. | |
| 2003/0079399 | A1 | | 5/2003 | Malfer et al. | |

FOREIGN PATENT DOCUMENTS

| CA | 2089833 | | 8/1993 |
| EP | 0 811 672 | | 12/1997 |
| EP | 0811 672 | A2 | 12/1997 |
| EP | 0 831 141 | | 3/1998 |
| GB | 1 368 532 | | 9/1974 |
| WO | WO 90/03359 | | 4/1990 |
| WO | WO 91/04959 | | 4/1991 |
| WO | WO 93/19140 | | 9/1993 |
| WO | WO 94/14739 | | 7/1994 |
| WO | WO 94/14925 | | 7/1994 |
| WO | WO 94/14926 | | 7/1994 |
| WO | WO 94/14929 | | 7/1994 |
| WO | WO 95/11955 | | 5/1995 |
| WO | WO 95/15366 | | 6/1995 |
| WO | WO 95/17485 | | 6/1995 |
| WO | WO 95/29972 | | 11/1995 |
| WO | WO 95/29973 | | 11/1995 |
| WO | WO 95/29974 | | 11/1995 |
| WO | 96 11999 | | 4/1996 |
| WO | WO 97/43357 | | 11/1997 |
| WO | WO 97/43358 | | 11/1997 |
| WO | WO 97/43359 | | 11/1997 |
| WO | WO 97/43360 | | 11/1997 |
| WO | WO 98/02468 | | 1/1998 |
| WO | WO 98/05741 | | 2/1998 |
| WO | WO 98/28346 | | 7/1998 |
| WO | WO 98/42808 | | 10/1998 |
| WO | WO 00/78898 | | 12/2000 |
| WO | WO 01/42399 | A1 | 6/2001 |

OTHER PUBLICATIONS

M. Rossenbeck, Georg Thieme Verlag Stuttgart, pp. 223-229, "Additive Fuer Kraftstoffe", 1978.
BP Chemicals, Ultravis 10, Technigram, "Properties and Applications of Ultravis High Performance Polybutene Polymers".
BASF, Technical Information, Glissopal CE 5203, "Raw Material for the Manufacture of Lubricating Oil Additives, Viscosity Improver, Synthetic Lubricating Oil Component, Insulating Oil".
Kirk-Othmer, Encyclopedia of Chemical Technology, $4^{th}$ Ed., Wiley, New York, vol. 8. pp. 944-955, 1993.
Declaration of John McMahon (5 pp.) (Jan. 11, 2004).
U.S. Appl. No. 10/542;345, filed Jul. 14, 2005, Lange et al.
U.S. Appl. No. 10/089,064, filed Apr. 2002, Lange et al.
"Preparation of 299," Pilot Plant Report, Nov. 6, 1956. BP Chemicals Press Cuttings.
BP Chemicals Press Release.
Norman, Sir Richard, et al., Principles of Organic Sysnthesis, Third Edition, 1993, pp. 261-264.
March, Jerry, Advanced Organic Chemistry, Reactions, Mechanisms, and Structure, Fourth Edition, 1992, p. 900.
Feb. 8, 2000 Press Release: Program for First SAE International Fuels & Lubricants Conference, Paris, France (Jun. 19-22, 2000).
Program for First SAE International Fuels & Lubricants Conference, Paris, France (Jun. 19-22, 2000), pp. 17-36.

(Continued)

*Primary Examiner* — Cephia D Toomer
(74) *Attorney, Agent, or Firm* — Oblon, Spivak, McClelland, Maier & Neustadt, L.L.P.

(57) ABSTRACT

Polyisobutenylphenol-containing Mannich adducts are prepared by
a) alkylation of a phenol with highly reactive polyisobutene having a number average molecular weight of less than 1000 and a polydispersity of less than 3.0, at below about 50° C. in the presence of an alkylation catalyst;
b) reaction of the reaction product from a) with
b1) an aldehyde chosen from formaldehyde, an oligomer and a polymer of formaldehyde and
b2) at least one amine which has at least one primary or one secondary amino function
and are used as detergent additives in fuel and lubricant compositions, and additive concentrates, fuel compositions and lubricant compositions contain these Mannich adducts.

42 Claims, No Drawings

OTHER PUBLICATIONS

Aradi, et al. A Study of Fuel Additives for Direct Injection (DIG) Injector Deposit Control, First SAE International Fuels & Lubricants Conference, Paris, France (Jun. 19-22, 2000).

Aradi et all., The Effect of Fuel Composition, Engine Operating Parameters and Additive Content on Injector Deposits in a High-Pressure Direct Injection Gasoline (DIG) Research Engine, Aachen Colloquium for Automobile and Engine Technology, pp. 187-211 (Oct. 4-6, 2000).

Aug. 14, 2006, letter from third party counsel, submitted in U.S. Appl. No. 10/536,451.

J. M. G. Cowie, "Polymers Chemistry and Physics of Modern Materials", Second Edition, 1991, 5 pp.

F. W. Billmeyer, Jr., "Textbook of Polymer Science", Second Edition, 1971, 4 pp.

W. W. Yau, et al., "Modern Size-Exclusion liquid Chromatography", Practice of Gel Permeation and Gel Filtration Chromatography, 1979, 4 pp.

"BP Chemicals Introduces Ultravis High-Performance Polybutene Polymer," BP Chemicals Press Release, Dec. 1990, 2 pp.

Assorted BP Chemicals Press Cuttings (4), 1 pg.

* cited by examiner

METHOD FOR PRODUCING MANNICH ADDUCTS THAT CONTAIN POLYISOBUTYLENE PHENOL

The present invention relates to a process for the preparation of polyisobutenylphenol-containing Mannich adducts, the Mannich adducts obtainable by this process and the use of the Mannich adducts as detergent additives in fuel and lubricant compositions.

Carburetors and intake systems of gasoline engines, but also injection systems for metering fuel, are increasingly contaminated with impurities which are caused by dust particles from the air, uncombusted hydrocarbon residues from the combustion chamber and the crank case vent gases passed into the carburetor.

These residues shift the air/fuel ratio during idling and in the lower part-load range so that the mixture becomes leaner and the combustion more incomplete and hence the proportions of uncombusted or partially combusted hydrocarbons in the exhaust gas become greater. Increasing gasoline consumption is the result.

It is known that, in order to avoid these disadvantages, fuel additives for keeping valves and carburetors or injection systems of gasoline engines clean are used (cf. for example M. Rossenbeck in Katalysatoren, Tenside, Mineralöladditive, editors J. Falbe and U. Hasserodt, page 223, G. Thieme Verlag, Stuttgart 1978).

Outstanding fuel additives of this type are aminoalkylated polyalkenyl hydroaromatics, as generally obtainable by a Mannich reaction of amines and aldehydes with polyalkyl-substituted hydroxyaromatics. These Mannich adducts are obtained as a rule in the form of complex mixtures of a plurality of amine-containing adducts having different cleaning activities and amine-free adducts generally having lower cleaning activities.

Such Mannich adducts generally have a good cleaning effect but possess a number of disadvantages.

Owing to the complex composition of the mixtures, a dark color and an intense odor, which adversely affect customer acceptance, are often observed. More serious, however, is the fact that, depending on composition, chain length of the polyalkylene moiety in the molecule, engine type and concentration in which the additive is used, such conventional Mannich adducts may cause sticking of the valves, which can lead to total engine failure. Sticking of the valves is understood as meaning complete loss of compression on one or more cylinders of the internal combustion engine if, owing to polymer deposits on the valve shaft, the spring forces are no longer sufficient to close the valves properly.

Thus, a number of publications, for example GB-A-1,368,532, U.S. Pat. No. 4,231,759, U.S. Pat. No. 5,634,951 and U.S. Pat. No. 5,725,612 describe fuel additives based on Mannich adducts, which are obtainable from polyolefin-substituted hydroxyaromatics. The Mannich adducts disclosed there are without exception those which are obtainable by alkylation of phenols with polyolefins having low reactivity and subsequent Mannich reaction. Such polyolefins having low reactivity are generally produced by polymerization of olefin mixtures and have a very nonuniform polymer backbone and a small proportion of terminal double bonds. The use of such polyolefins having low reactivity for the preparation of Mannich adducts leads to low yields in the alkylation step (less than 83%, cf. for example U.S. Pat. No. 5,634,951), nonuniform product distribution and a moderate cleaning effect when used as a fuel additive.

In contrast, EP-A-0 831 141 describes improved detergents for hydrocarbon fuels, which are obtainable from a highly reactive polyisobutene which has at least 70% olefinic double bonds of the vinylidene type, an aldehyde and ethylenediamine by a Mannich reaction with a polyisobutene-substituted phenol. The polyisobutenes used in the alkylation have an average molecular weight of 1000 and lead to polyisobutene-substituted phenols which have a ratio of para to ortho substitution of about 3:1.

However, these additives based on Mannich products were also incapable of eliminating the known problems, such as undesired color, unpleasant odor, and especially the problematic sticking of the valves. Moreover, a further increase in the efficiency of such fuel additives is desirable, on the other hand in order to keep pace with the increasing requirements arising from the progressive engine technology and, on the other hand, as far as possible to extend downward the concentration range for the additives in the fuel which is required for the desired effect.

It is an object of the present invention to provide Mannich products based on polyalkylenephenols having improved properties.

We have surprisingly found that this object is achieved and that such Mannich adducts having improved properties are obtained if specific polyisobutenyl-substituted phenols, which are obtained by alkylation of phenols with polyisobutenes having a number average molecular weight of less than 1000, are reacted with formaldehyde or oligomers or polymers of formaldehyde in the presence of an amine. In particular, it is surprising that the Mannich adducts thus obtained exhibit substantially improved viscosity behavior, in particular at low temperatures, and an improved detergent effect without the common disadvantages of the prior art. In addition, it was found that the Mannich adducts thus obtained can be particularly easily fractionated by column chromatography and hence made more uniform.

The present invention therefore relates to a process for the preparation of polyisobutenylphenol-containing Mannich adducts by a) alkylation of a phenol with highly reactive polyisobutene having a number average molecular weight of less than 1000 and a polydispersity of less than 3.0 at below about 50° C. in the presence of an alkylation catalyst;

b) reaction of the reaction product from a) with b1) an aldehyde chosen from formaldehyde, an oligomer and a polymer of formaldehyde and b2) at least one amine which has at least one primary or one secondary amino function.

Suitable polyisobutenes are highly reactive polyisobutenes, which differ from the polyisobutenes having low reactivity through the content of terminally arranged ethylenic double bonds. Suitable highly reactive polyisobutenes are, for example, polyisobutenes which have more than 70, in particular more than 80, especially more than 85, mold. Particularly preferred polyisobutenes are those which have uniform polymer backbones. In particular, those polymers which are composed of at least 85, preferably at least 90, particularly preferably at least 95, % by weight of isobutene units have uniform polymer backbones. Preferably, such highly reactive polyisobutenes have a number average molecular weight of less than 900 and in particular of less than 850. Highly reactive polyisobutenes which have a number average molecular weight of from 300 to 850, particularly preferably from 400 to 800, very particularly preferably from 550 to 800, for example a number average molecular weight of about 450, about 550 or about 750, are particularly suitable. Mixtures of highly reactive polyisobutenes can also be used, in which the mixture has a total number average molecular weight of less than 1000. Preferably, the highly reactive polyisobutenes moreover have a polydispersity of less than 1.9, in particular less than 1.7 and particularly preferably less than 1.5. Polydispersity is understood as meaning the quotient of weight average molecular weight $M_W$ and number average molecular weight $M_N$.

Particularly suitable highly reactive polyisobutenes are, for example, the Glissopal® brands from BASF AG, in particular Glissopal 1000 ($M_N$=1000), Glissopal V 33 ($M_N$=550) and mixtures thereof having a number average molecular weight $M_N$<1000. Other number average molecular weights can be established in a manner known in principle by mixing polyisobutenes of different number average molecular weights or by extractive enrichment of polyisobutenes of specific molecular weight ranges. They are also obtainable by direct synthesis.

A phenol is reacted (alkylated) with such a highly reactive polyisobutene in a first step (step a)). Aromatic hydroxy compounds, such as unsubstituted phenol and monosubstituted or disubstituted phenols, are very generally suitable for the reaction with highly reactive polyisobutenes. The aromatic hydroxy compound used for the alkylation is preferably selected from phenolic compounds having 1, 2 or 3 OH groups which may optionally have at least one further substituent. Particularly suitable substituted phenols are monoortho-substituted phenols. Suitable substituents are, for example, $C_1$-$C_{20}$-alkyl, $C_1$-$C_{20}$-alkoxy or a further polyalkylene radical, in particular polyalkylene radicals based on highly reactive polyisobutenes. Particularly suitable substituents are $C_1$-$C_7$-alkyl, such as methyl, ethyl, n-propyl, isopropyl, n-butyl, sec-butyl, tert-butyl and hexyl. Particularly suitable alkyl-substituted phenols are 2-methylphenol and 2-ethylphenol. Unsubstituted phenol is particularly preferred for the alkylation with polyisobutenes.

In the alkylation, the phenol is usually used in excess. For example, about 1.1- to 6-fold, preferably 1.6- to 5-fold, excess, such as a 2-fold or a 4-fold excess, of the phenol is suitable. The crude product obtained is further reacted under b), if required after purification.

In one embodiment of the present process, the phenol is used in excess in the preparation of the polyisobutenylphenol and, after the end of the reaction, the reaction mixture is freed from excess phenol by extraction with solvents, preferably polar solvents, such as water or $C_1$-$C_6$-alkanols or mixtures thereof, by stripping, i.e. by passing steam through or, if required, heating of gases, e.g. nitrogen, or by distillation.

The alkylation of the phenol is carried out at below about 50° C., preferably below 35° C., in particular below 25° C., in the presence of an alkylation catalyst. As a rule the alkylation is carried out at above −40° C., preferably above −30° C., in particular above −20° C. Temperatures from −10 to +30° C., in particular from −5 to +25° C., particularly preferably from 0 to +20° C., are particularly suitable for the alkylation.

Suitable alkylation catalysts are known to a person skilled in the art. For example, protic acids, such as sulfuric acid, phosphoric acid and organic sulfonic acids, e.g. trifluoromethanesulfonic acid, Lewis acids, such as aluminum trihalides, e.g. aluminum trichloride or aluminum tribromide, boron trihalides, e.g. boron trifluoride and boron trichloride, tin halides, e.g. tin tetrachloride, titanium halides, e.g. titanium tetrabromide and titanium tetrachloride, and iron halides, e.g. iron trichloride and iron tribromide, are suitable. Adducts of boron trihalides, in particular boron trifluoride, with electron donors such as alcohols, in particular $C_1$-$C_6$-alkanols or phenols, or ethers are preferred. Boron trifluoride etherate and boron trifluoride phenolate are particularly preferred.

The alkylation is preferably carried out in a liquid medium. For this purpose, the phenol is preferably dissolved in one of the reactants and/or in a solvent, if necessary with heating. In a preferred embodiment, the alkylation is preferably carried out by first melting the phenol or the substituted phenol by supplying heat and then adding a suitable solvent and/or the alkylation catalyst, in particular the boron trihalide adduct. The liquid mixture is then brought to a suitable reaction temperature. In a further preferred embodiment the phenol is first melted and the polyisobutene and, if required, suitable solvent are added. The liquid mixture thus obtained can be brought to a suitable reaction temperature and the alkylation catalyst can then be added.

Suitable solvents for carrying out this reaction are, for example, hydrocarbons, preferably pentane, hexane and heptane, in particular hexane, hydrocarbon mixtures, e.g. petroleum naphthas having boiling ranges from 35 to 100° C., dialkyl ethers, in particular diethyl ether, and halogenated hydrocarbons, such as dichloromethane or trichloromethane, and mixtures of the abovementioned solvents.

The reaction is preferably initiated by adding the catalyst or one of the two reactants, phenol or polyisobutene. The addition of the component initiating the reaction is preferably effected over a period of from 5 to 300, preferably from 10 to 200, in particular from 15 to 180, minutes, the temperature of the reaction mixture advantageously not exceeding the above-mentioned temperature ranges. After the end of the addition, the reaction mixture is allowed to continue reacting for preferably from 30 minutes to 24 hours, in particular from 60 minutes to 16 hours, at below 30° C. The reaction conditions are preferably chosen so that at least 85%, in particular at least 90%, particularly preferably at least 95%, of the polyisobutenylphenol form. The polyisobutenyl-substituted phenols thus obtained preferably comprise (where the aromatic hydroxy compound used as starting material allows) more than 85%, in particular more than 90%, and particularly preferably more than 95%, of isomers whose polybutenyl radical is para to the hydroxyl group of the phenol.

Preferably, the alkylation product used for the subsequent reaction in steps b) and c) includes little if any unconverted phenols.

When the aromatic hydroxy compound used for the alkylation in step a) allows multiple alkylations, the reaction is preferably carried out in such a way that the polyisobutenylphenols obtained include little if any product more than monoalkylated by the polyisobutene. In fact, the alkylation products used for the subsequent reaction in steps b) or c) include not more than 20 mol %, preferably not more than 10 mol %, especially not more than 5 mol %, based on the total amount of alkylation products, of more than monoalkylated phenols.

The reaction product obtained under a) is reacted under b) with an aldehyde chosen from formaldehyde, an oligomer and/or a polymer of formaldehyde (b1) and at least one amine which has at least one primary or at least one secondary amino function (b2). This reaction is referred to as a rule as Mannich or Mannich-analogous reaction. Aldehyde is synonymous here with formaldehyde-releasing compound or formaldehyde.

Suitable aldehydes are in particular formaldehyde, formalin solutions, formaldehyde oligomers, e.g. trioxane, or polymers of formaldehyde, such as paraformaldehyde. Paraformaldehyde is preferably used. Formalin solution is particularly easy to handle. Of course, gaseous formaldehyde may also be used.

Suitable amines have at least one primary or secondary amino function. In the context of this invention, primary amino functions are amino functions of the formula $HNR^4R^5$, where one of the radicals $R^4$ or $R^5$ is hydrogen and the other radical is chosen from substituents other than hydrogen.

In the context of this invention, secondary amino functions are amino functions of the formula $HNR^4R^5$, where $R^4$ and $R^5$ are chosen from substituents other than hydrogen.

The radicals $R^4$ and $R^5$ are preferably chosen from hydrogen and $C_1$- to $C_{20}$-alkyl, $C_3$- to $C_8$-cycloalkyl and $C_1$- to $C_{20}$-alkoxy radicals which may be interrupted and/or substituted by heteroatoms selected from N and O, it being possible for the heteroatoms in turn to carry substituents, preferably selected from H, $C_1$-$C_6$-alkyl, aryl and hetaryl; or $R^4$ and $R^5$, together with the N atom to which they are bonded, form a 5- or 6-membered cyclic structure which may have one or two heteroatoms selected from N and O and may be substituted by one, two or three $C_1$- to $C_6$-alkyl radicals. Furthermore, $R^4$ and $R^5$ may be aryl or hetaryl. Aryl and hetaryl radicals may have from one to three substituents selected, for example, from hydroxyl and the above-mentioned alkyl, cycloalkyl or alkoxy radicals and polyisobutenyl radicals.

Examples of suitable radicals $R^4$ and $R^5$ are hydrogen, methyl, ethyl, n-propyl, sec-propyl, isopropyl, n-butyl, isobutyl, sec-butyl, tert-butyl, n-pentyl and n-hexyl, 5-, 6- and 7-membered saturated, unsaturated or aromatic carbocyclic and heterocyclic structures, such as cyclopentyl, cyclohexyl, phenyl, tolyl, xylyl, cycloheptyl, naphthyl, tetrahydrofuranyl, tetrahydropyranyl, dioxanyl, pyrrolidyl, piperidyl, pyridyl and pyrimidyl.

Suitable compounds of the formula $HNR^4R^5$ which have exclusively a primary amino function are, for example, methylamine, ethylamine, n-propylamine, isopropylamine, n-butylamine, isobutylamine, sec-butylamine, tert-butylamine, pentylamine, hexylamine, cyclopentylamine, cyclohexylamine, aniline and benzylamine.

Suitable compounds of the formula $HNR^4R^5$ which have exclusively a primary amino function and in which $R^4$ or $R^5$ is alkyl interrupted and/or substituted by the heteroatom O are, for example, $CH_3-O-C_2H_4-NH_2$, $C_2H_5-O-C_2H_4-NH_2$, $CH_3-O-C_3H_6-NH_2$, $C_2H_5-O-C_3H_6-NH_2$, $n-C_4H_9-O-C_4H_8-NH_2$, $HO-C_2H_4-NH_2$, $HO-C_3H_7-NH_2$ and $HO-C_4H_8-NH_2$.

Suitable compounds of the formula $HNR^4R^5$ which have exclusively a secondary amino function are, for example, dimethylamine, diethylamine, methylethylamine, di-n-propylamine, diisopropylamine, diisobutylamine, di-sec-butylamine, di-tert-butylamine, dipentylamine, dihexylamine, dicyclopentylamine, dicyclohexylamine and diphenylamine.

Suitable compounds of the formula $HNR^4R^5$ which have exclusively a secondary amino function and in which $R^4$ and $R^5$ are alkyl interrupted and/or substituted by the heteroatom O are, for example, $(CH_3-O-C_2H_4)_2NH$, $(C_2H_5-O-C_2H_4)_2NH$, $(CH_3-O-C_3H_6)_2NH$, $(C_2H_5-O-C_3H_6)_2NH$, $(n-C_4H_9-O-C_4H_8)_2NH$, $(HO-C_2H_4)_2NH$, $(HO-C_3H_6)_2NH$ and $(HO-C_4H_8)_2NH$.

Suitable compounds of the formula $HNR^4R^5$ in which $R^4$ and $R^5$, together with the N atom to which they are bonded, form a 5-, 6- or 7-membered cyclic structure which may have one or two heteroatoms selected from N and O and may be interrupted by one, two or three $C_1$- to $C_6$-alkyl radicals are, for example, pyrrolidine, piperidine, morpholine and piperazine and their substituted derivatives, such as $N-C_1$- to $C_6$-alkylpiperazines and dimethylmorpholine.

Suitable compounds of the formula $HNR^4R^5$ which have alkyl radicals interrupted and/or substituted by N are alkylenediamines, dialkylenetriamines, trialkylenetetramines and polyalkylenepolyamines, such as oligo- or polyalkyleneimines, in particular oligo- and polyethyleneimines, preferably oligoethyleneimines, consisting of from 2 to 20, preferably from 2 to 10, particularly preferably from 2 to 6, ethyleneimine units. Suitable compounds of this type are in particular n-propylenediamine, 1,4-butanediamine, 1,6-hexanediamine, diethylenetriamine, triethylenetetramine and polyethyleneimines, and their alkylation products, which have at least one primary or secondary amino function, e.g. 3-(dimethylamino)-n-propylamine, N,N-dimethylethylenediamine, N,N-diethylethylenediamine and N,N,N',N'-tetramethyldiethylenetriamine, are suitable. Ethylenediamine is likewise suitable.

Further suitable compounds of the formula $HNR^4R^5$ are the reaction products of alkylene oxides, in particular ethylene oxide, with primary amines, and copolymers of ethylene oxide with ethyleneimine and/or primary or secondary $C_1$- to $C_6$-alkylamines.

Preferred compounds of the formula $HNR^4R^5$ are 3-(dimethylamino)-n-propylamine, di[3-(dimethylamino)-n-propyl]amine, di[3-(diethylamino)-n-propyl]amine, di[2-(dimethylamino)ethyl]amine, dimethylamine, diethylamine, di-n-propylamine, diisopropylamine, dicyclohexylamine, pyrrolidine, piperidine, morpholine, dimethylmorpholine, N-methylpiperazine, $HO-C_2H_4-NH_2$, $(HO-C_2H_4)_2NH$, $H_3C-O-(CH_2)_2-NH_2$, $H_3C-O-(CH_2)_3-NH_2$, diethylenetriamine, triethylenetetramine, N,N-diethylethylenediamine, N,N,N',N'-tetramethyldiethylenetriamine and polyethyleneimines.

Particularly preferred compounds of the formula $HNR^4R^5$ are 3-(dimethylamino)-n-propylamine, di[3-(dimethylamino)-n-propyl]amine, dimethylamine, diethylamine and morpholine.

The reaction temperatures suitable for the reaction b) depend on a number of factors. In the case of the (Mannich) reaction, water of reaction is formed. As a rule, this is removed from the reaction mixture. The water of reaction can be removed during the reaction, at the end of the reaction time or after the reaction is complete, for example by distillation. Advantageously, the water of reaction can be removed by heating the reaction mixture in the presence of entraining agents. Examples of suitable entraining agents are organic solvents which form an azeotropic mixture with water and/or have a boiling point above the boiling point of water.

Particularly suitable entraining agents are paraffins, benzene and alkylaromatics, in particular toluene, xylenes and mixtures of alkylaromatics with other (high-boiling) hydrocarbons. As a rule, the water of reaction is removed at a temperature which roughly corresponds to the boiling point of the entraining agent or of the azeotropic mixture of water and entraining agent.

Suitable temperatures for removing the water of reaction are therefore from 75 to 200° C., preferably from 80 to 180° C., particularly preferably from 80 to 150° C., at atmospheric pressure. If the water of reaction is removed at reduced pressure, the temperature should be reduced in accordance with the lower boiling points.

Suitable reaction temperatures for the (Mannich) reaction are preferably from 10 to 200° C., in particular from 20 to 180° C., e.g. about 35° C., about 90° C., about 120° C. or about 140° C.

In a preferred embodiment, the (Mannich) reaction and the removal of the water of reaction, is carried out at about atmospheric pressure and about 80° C., about 110° C. or about 130° C. using aromatic solvents, preferably toluene, xylenes or mixtures thereof, as entraining agents. The (Mannich) reaction is preferably carried out by combining the reactants at from 10 to 50° C., if necessary mixing them for from 10 to 300 minutes in this temperature range and then bringing them, in the course of from 5 to 180, preferably from 10 to 120, minutes to the temperature necessary for removing the water of reaction by distillation.

The total reaction time for the conversion of the polyisobutenylphenols into the Mannich adducts is in general from minutes to 24 hours, preferably from 30 minutes to 16 hours, particularly preferably from 60 minutes to 8 hours.

In the Mannich reaction carried out under b), as a rule from 0.5 to 3.0, preferably from 0.5 to 2.0, in particular from 0.8 to 1.5, mol of aldehyde (b1) and from 0.5 to 3.0, preferably from 0.5 to 2.0, in particular from 0.8 to 1.5, mol of amine (b2), based on 1 mol of polyisobutenylphenol from a), are used.

In a preferred embodiment of the novel process, the reactants aldehyde, amine and polyisobutenylphenol are particularly preferably used in a roughly equimolar ratio, a ratio of about 2:2:1 or, particularly when the amine is a primary amine, in a ratio of about 2:1:1. As a rule, a substantially uniform product spectrum with a high proportion of amine-containing compounds can thus be achieved. A roughly equimolar ratio of the reactants leads to the preferred formation of monoaminomethylated compounds, a reactant ratio of about 2:2:1 to the preferred formation of bisaminomethylated compounds and a reactant ratio of about 2:1:1 to the preferred formation of monoaminomethylated compounds with a benzoxazine structure, for example of the formula Ib.

The reaction described under b) can be carried out, for example, by combining polyisobutenylphenol, amine and aldehyde and bringing the reaction mixture to the desired reaction temperature, preferably to the abovementioned temperature ranges. The reaction described under b) can also be carried out by first adding the aldehyde to the polyisobutenylphenol and, if required, a solvent, and, if required, heating to the reaction temperature and then adding at least one amine. The addition of the amine can be effected in one portion or over a period of from 5 to 300, preferably from 10 to 150, minutes by addition of a plurality of portions or by continuous addition. The reaction described under b) can also be carried out by first combining polyisobutenylphenol and, if required, solvent and amine, if required heating to the reaction temperature and then adding the aldehyde, it being possible to add the aldehyde as described above for the amine.

In a preferred embodiment, aldehyde, amine, and, if required, solvent are combined and reacted, if required, with heating to temperature ranges described above and within the reaction times described above. During or after the reaction, resulting water of reaction can if desired be removed, as described above. The reaction product thus obtained and comprising the amine and aldehyde can, if desired, be purified and/or isolated. The reaction product obtained from amine and aldehyde and the polyisobutenylphenol are then mixed with one another, it being possible to carry out the combination in one portion, in a plurality of portions or continuously in the periods stated above. By means of this procedure, it is possible in many cases to achieve a particularly uniform product spectrum, in particular if the reactants are used in about equimolar amounts or in a stoichiometric ratio of aldehyde, amine and polyisobutenylphenol of about 1:2:1 or about 2:2:1 or about 2:1:1.

In a further embodiment, the polyisobutenylphenols can be subjected to a Mannich-analogous reaction with aminals or hemiaminals to give Mannich adducts. Such aminals or hemiaminals are obtainable from the abovementioned aldehydes and amines, and can be produced in a one-pot reaction in the presence of the polyisobutenylphenols or prepared separately, for example as in the abovementioned embodiment. Such hemiaminals can be etherified with $C_1$-$C_{12}$-alkanols or esterified with $C_1$-$C_{12}$-carboxylic acids. Suitable aminals are, for example, N,N,N',N'-tetramethylmethylenediamine, N,N,N',N'-tetraethylmethylenediamine, bis{di[3-(dimethylamino)-n-propyl]amino}methane, bis(morpholino)methane and bis(4-methylpiperazino)methane. Suitable hemiaminals are, for example, N-hydroxymethylmorpholine and N-hydroxymethyldiisopropylamine.

In a further embodiment, the polyisobutenylphenol is converted into bisaminomethylated Mannich adducts through suitable choice of the stroichiometry. For the preparation of the bisadducts, aldehyde and amines are preferably used in an approximately two-fold to three-fold excess and aminals or hemiaminals are preferably used in a two-fold to three-fold excess and, if required, the reaction time is prolonged.

As a rule, the novel processes give adduct mixtures which comprise at least 40, frequently at least 50, particularly preferably at least 60, mol % of compounds of the formula Ia and/or Ib

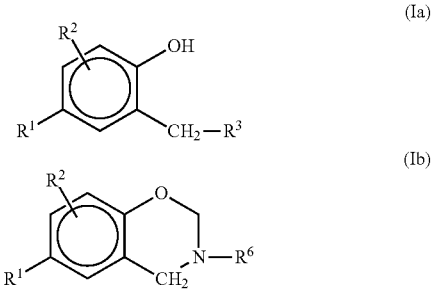

where
$R^1$ is a terminally bonded polyisobutenyl radical,
$R^2$ is H, $C_1$- to $C_{20}$-alkyl, $C_1$- to $C_{20}$-alkoxy, hydroxyl, a polyalkylene radical or $CH_2NR^4R^5$, where $R^4$ and $R^5$ have the meanings stated below, and
$R^3$ is $NR^4R^5$, where $R^4$ and $R^5$, independently of one another, are selected from H, $C_1$- to $C_{20}$-alkyl, $C_3$- to $C_8$-cycloalkyl and $C_1$- to $C_{20}$-alkoxy radicals which may be interrupted and/or substituted by heteroatoms selected from N and O, and phenol radicals of the formula II,

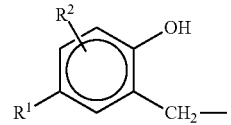

where $R^1$ and $R^2$ are as defined above;
with the proviso that $R^4$ and $R^5$ are not simultaneously H or phenol radicals of the formula II; or $R^4$ and $R^5$, together with the N atom to which they are bonded, form a 5-, 6- or 7-membered cyclic structure which has one or two heteroatoms selected from N and O and may be substituted by one, two or three $C_1$- to $C_6$-alkyl radicals; and
$R^6$ is a radical $R^4$ or $R^5$ other than H.

The compounds of the formula Ib (dihydrobenzoxazines) can be formed in the presence of formaldehyde sources or formaldehyde equivalents from compounds of the formula Ia, where $R^4$ or $R^5$ is H.

Preferred radicals $R^1$ to $R^6$ are derived from the polyisobutenes, phenols, formaldehyde sources or formaldehyde equivalents and amines described above.

Preferably, the Mannich adducts of the formula Ia and/or Ib are monomolecular polyisobutenylphenol-amines which have only one polyisobutenylphenol unit per molecule. Oligomeric polyisobutenylphenolamines having two, three or more polyisobutenylphenol units per molecule are formed only in a small amount, if at all.

In many cases, the novel process gives an adduct mixture which contains at least 40, frequently at least 50, particularly preferably at least 60, mol % of a compound selected from compounds of the formula Ia or Ib. The preferred embodiments of the novel process can be a mixture of Mannich adducts or chemically uniform Mannich adducts which comprises at least 70 or at least 80 mol % of compounds of the formula Ia and/or Ib.

If desired, the products obtained by the novel processes may be further purified, for example by extraction, distillation or column chromatography, in particular as described below.

The present invention furthermore relates to the Mannich adducts of the formulae Ia and Ib which are obtained by the novel process, in the form of their pure substances.

In a preferred embodiment the adduct mixture comprises at least 40, in particular at least 50, particularly preferably at least 60, mol % of at least one compound selected from the N- or N,N-substituted derivatives of N,N-bis(2-hydroxy-5-polyisobutenylbenzyl)amine (e.g. compounds of the formula Ia, where $R^2$ is H, $R^3$ is $NR^4R^5$, $R^4$ is a phenol radical of the formula II whose radical $R^2$ is likewise H, and $R^5$ is a radical other than H and other than phenol radicals of the formula II), 2-aminomethyl-4-polyisobutenylphenols (e.g. compounds of the formula Ia, where $R^2$ is H, $R^3$ is $NR^4R^5$, $R^4$ and $R^5$ are radicals other than phenol radicals of the formula II and $R^4$ and $R^5$ are not simultaneously H), 2,6-bisaminomethyl-4-polyisobutenylphenols (e.g. compounds of the formula Ia, where $R^2$ is $CH_2NR^4R^5$ in the ortho position, $R^3$ is $NR^4R^5$, and $R^4$ and $R^5$ are radicals other than phenol radicals of the formula II and $R^4$ and $R^5$ are not simultaneously H) and 3,4-dihydro-1, 3-2H-benzoxazines (e.g. compounds of the formula Ib, where $R^2$ is H and $R^6$ is a radical $R^4$ or $R^5$ other than H).

In a further preferred embodiment, the adduct mixture contains at least 40, in particular at least 50, particularly preferably at least 60, mol % of N- or N,N-substituted derivatives of 2-aminomethyl-4-polyisobutenylphenol (e.g. compounds of the formula Ia, where $R^2$ is H, $R^3$ is $NR^4R^5$, $R^4$ and $R^5$ are radicals other than phenol radicals of the formula II and $R^4$ and $R^5$ are not simultaneously H) and/or 3,4-dihydro-1, 3-2H-benzoxazine (e.g. compounds of the formula Ib, where $R^2$ is H and $R^6$ is a radical $R^4$ or $R^5$ other than H). These are referred to as mono-Mannich adducts.

In a preferred embodiment, the Mannich adducts obtainable by the process of the invention include little if any alkylation product of step a) that has not been further reacted. Since the Mannich reaction is an equilibrium reaction, the product will normally include a residual fraction of alkylation products from step a). The fraction in the Mannich adducts which is polyisobutenylphenol which has not been further reacted is typically from 0 to 20 mol %, usually from 1 to 15 mol %, especially from 5 to 10 mol %, based on the total amount of the adduct mixture obtained. The polyisobutenylphenol fraction can be set to a desired value via the reaction management of steps b) and c) or customary separation processes. A preferred separation process is the hereinafter described column chromatography. Since, however, a residual fraction of alkylation products which have not been reacted further is surprisingly not troublesome and frequently even advantageous, it is generally possible to dispense not only with inconvenient process measures for an ideally complete reaction in steps b) and c) but also with further separating steps.

The Mannich adduct mixtures described above, in particular their nitrogen-containing components, can be fractionated by column chromatography over stationary phases. The fractionation can be effected by means of one-stage or multistage elution. Suitable eluents are, for example, hydrocarbons, alcohols, ketones, water and mixtures thereof, to which bases, e.g. amines or alkalis, may be added. The fractionation can advantageously be carried out by multistage elution, preferably with at least one hydrocarbon and then at least one basic alcohol/water mixture.

Particularly suitable stationary phases are oxides, as are usual in column chromatography. Acidic oxides, such as acidic alumina, are preferred, acidic silica gel being particularly preferred. A preferably used basic alcohol/water mixture is a mixture comprising a) from 75 to 99.5, in particular from 85 to 98, particularly preferably from 90 to 97, % by weight of at least one $C_2$-$C_4$-alcohol, in particular ethanol and/or isopropanol, particularly preferably isopropanol, b) from 0.4 to 24.4% by weight of water and c) from 0.1 to 15, in particular from 0.5 to 10, particularly preferably from 1 to 5, % by weight of at least one amine which is volatile at room temperature.

Suitable amines volatile at room temperature are, for example, ammonia, mono-$C_1$-$C_8$-alkylamines, di-$C_1$-$C_6$-alkylamines and tri-$C_1$-$C_4$-alkylamines, in particular ammonia, methylamine, ethylamine, n-propylamine, isopropylamine, dimethylamine, diethylamine, di-n-propylamine, diisopropylamine, di-n-butylamine, di-sec-butylamine, di-tert-butylamine, trimethylamine, triethylamine, diisopropylethylamine and triisopropylamine. Ammonia is particularly preferred.

As a rule, the fractionation is carried out by column chromatography in such a way that the adduct mixture is added to a column filled with a stationary phase and, if required, conditioned. If necessary, in a first step, the column with the added adduct mixture can then be washed with a nonpolar solvent, for example an aliphatic or aromatic hydrocarbon. This makes it possible, for example, to elute fractions not containing amines. The fractionation of the adduct mixture, in particular of the amine-containing components, is effected by, preferably, multistage elution with an alcohol/water mixture as described above. The elution can be carried out with an alcohol/water mixture of either constant composition or variable composition, for example by means of a one-stage or multistage gradient or a continuous gradient.

The process as described above can be used on the one hand for isolating those components of the adduct mixture which do not contain amines and then recovering the unfractionated amine-containing components of the adduct mixture. On the other hand, those components of the adduct mixture which do not contain nitrogen can, if required, be first isolated and the nitrogen-containing components then fractionated. With a suitable separation efficiency of the column used, the adduct mixtures can, if desired, be fractionated down to the individual compounds.

Preferably, adduct mixtures having a polydispersity of from 1.05 to 3.5, in particular from 1.1 to 2.5, particularly preferably from 1.1 to 1.9, are obtainable by the novel process.

The desired polydispersity can be established by a careful choice of the starting materials, choice of the stoichiometry, choice of the temperature and reaction time and possibly of the working up, in particular by conventional purification techniques, such as extraction and distillation and, if required, the novel fractionation by column chromatography.

Suitable measures which, individually or in combination, promote the formation of adduct mixtures having high activity and/or low polydispersity are, for example, selected from
- use of polyisobutenes of low polydispersity,
- use of polyisobutenes having very high proportions of terminal double bonds,
- use of the polyisobutenes in less than the stoichiometric amount in the alkylation of the phenols, if necessary followed by subsequent removal of the unconverted phenols,
- carrying out the alkylation at a temperature which is as low as possible but still ensures complete conversion, for example at above about +5° C. and below about +30° C.,
- maintaining a suitable stoichiometry, for example an aldehyde:amine:polyisobutenylphenol ratio of about 1:1:1 or about 1:2:1 (for the preparation of mono-Mannich adducts) or 2:2:1 (for the preparation of bis-Mannich adducts) or 2:1:1 (leads to the formation of oxazines when primary amines are used) or 2:1:2, where in the last case a primary amine is preferably used (leads to the preparation of bisarylmonoamines),
- removal of the adducts which do not contain amine from the mixture by fractionation by column chromatography,
- fractionation of the amine-containing adducts of the mixture by column chromatography, preferably over acidic stationary phases by elution with basic alcohol/water mixtures.

The present invention furthermore relates to a Mannich adduct obtainable by a process as described above.

The present invention also relates to a Mannich adduct containing at least one compound of the formula Ia and/or Ib.

The present invention also relates to the use of at least one above-defined Mannich adduct as a detergent additive in fuel and lubricant compositions, if necessary in combination with further conventional fuel and lubricant additives.

Examples of such additional components are further additives having a detergent action or having an action which inhibits valve seat wear, these comprising at least one hydrophobic hydrocarbon radical having a number average molecular weight ($M_N$) of from 85 to 20,000 and at least one polar group selected from
(a) mono- or polyamino groups having up to 6 nitrogen atoms, at least one nitrogen atom having basic properties,
(b) nitro groups, if required in combination with hydroxyl groups,
(c) hydroxyl groups in combination with mono- or polyamino groups, at least one nitrogen atom having basic properties,
(d) carboxyl groups or their alkali metal or alkaline earth metal salts,
(e) sulfo groups or their alkali metal or alkaline earth metal salts,
(f) polyoxy-$C_2$- to $C_4$-alkylene groups which are terminated by hydroxyl groups or mono- or polyamino groups, at least one nitrogen atom having basic properties, or by carbamate groups,
(g) carboxylic ester groups,
(h) groups derived from succinic anhydride and having hydroxyl and/or amino and/or amido and/or imido groups, and
(i) groups produced by conventional Mannich reaction of phenolic hydroxyl groups with aldehydes and mono- or polyamines.

Examples of the above additive components having a detergent action or having an action which inhibits valve seat wear are:

additives containing mono- or polyamino groups (a) are preferably polyalkenemono- or polyalkenepolyamines based on polypropene or on highly reactive (i.e. having predominantly terminal double bonds, generally in the β- and γ-positions) or conventional (i.e. having predominantly central double bonds) polybutene or polyisobutene which have an $M_N$ of from 300 to 5000. Such additives based on highly reactive polyisobutene, which can be prepared from the polyisobutene which may contain up to 20% by weight of n-butene units by hydroformylation and reductive amination with ammonia, monoamines or polyamines, such as dimethylaminopropylamine ethylenediamine, diethylenetriamine, triethylenetetramine or tetraethylenepentamine, are disclosed in particular in EP-A 244 616. If polybutene or polyisobutene having predominantly central double bonds (generally in the β and γ positions) is used as a starting material in the preparation of the additives, the preparation by chlorination and the subsequent amination or by oxidation of the double bond with air or ozone to give the carbonyl or carboxyl compound and subsequent amination under reductive (hydrogenating) conditions is a possible method. Here, the amines used for the amination may be the same as those used above for the reductive amination of the hydroformylated highly reactive polyisobutene. Corresponding additives based on polypropene are described in particular in WO-A 94/24231.

Further preferred additives containing monoamino groups (a) are the hydrogenation products of the reaction products of polyisobutenes having an average degree of polymerization P of from 5 to 100 with oxides of nitrogen or mixtures of oxides of nitrogen and oxygen, as described in particular in WO-A 97/03946.

Further preferred additives containing monoamino groups (a) are the compounds obtainable from polyisobutene epoxides by reaction with amines and subsequent dehydration and reduction of the amino alcohols, as described in DE-A 196 20 262.

Additives containing nitro groups, if required in combination with hydroxyl groups (b), are preferably reaction products of polyisobutenes having an average degree of polymerization P of from 5 to 100 or from 10 to 100 with oxides of nitrogen or mixtures of oxides of nitrogen and oxygen, as described in particular in WO-A 96/03367 and WO-A 96/03479. These reaction products are as a rule mixtures of pure nitropolyisobutanes (e.g. α,β-dinitropolyisobutane) and mixed hydroxynitropolyisobutanes (e.g. α-nitro-β-hydroxypolyisobutane).

Additives containing hydroxyl groups in combination with mono- or polyamino groups (c) are in particular reaction products of polyisobutene epoxides, obtainable from polyisobutene having preferably predominantly terminal double bonds and an $M_N$ of from 300 to 5000, with ammonia or mono- or polyamines, as described in particular in EP-A 476 485.

Additives containing carboxyl groups or their alkali metal or alkaline earth metal salts (d) are preferably copolymers of $C_2$-$C_{40}$-olefins with maleic anhydride having a total molar mass of from 500 to 20,000, some or all of whose carboxyl groups have been converted into the alkali metal or alkaline earth metal salts and a remainder of the carboxyl groups have been reacted with alcohols or amines. Such additives are disclosed in particular in EP-A 307 815. Such additives serve mainly for preventing valve seat wear and, as described in WO-A 87/01126 can advantageously be used in combination with conventional fuel detergents, such as poly(iso)buteneamines or polyetheramines.

Additives containing sulfo groups or their alkali metal or alkaline earth metal salts (e) are preferably alkali metal or alkaline earth metal salts of an alkyl sulfosuccinate, as described in particular in EP-A 639 632. Such additives serve mainly for preventing valve seat wear and can advantageously be used in combination with conventional fuel detergents, such as poly(iso)buteneamines or polyetheramines.

Additives containing polyoxy-$C_2$- to $C_4$-alkylene groups (f) are preferably polyethers or polyetheramines, which are obtainable by reaction of $C_2$- to $C_{60}$-alkanols, $C_6$- to $C_{30}$-alkanediols, mono- or di-$C_2$-$C_{30}$-alkylamines, $C_1$-$C_{30}$-alkylcyclohexanols or $C_1$-$C_{30}$-alkylphenols with from 1 to 30 mol of ethylene oxide and/or propylene oxide and/or butylene oxide per hydroxyl group or amino group and, in the case of the polyetheramines, by subsequent reductive amination with ammonia, monoamines or polyamines. Such products are described in particular in EP-A 310 875, EP-A 356 725, EP-A 700 985 and U.S. Pat. No. 4,877,416. In the case of polyethers, such products also have carrier oil properties. Typical examples of these are tridecanol butoxylates, isotridecanol butoxylates, isononylphenol butoxylates and polyisobutenol butoxylates and propoxylates and the corresponding reaction products with ammonia.

Additives containing carboxylic ester groups (g) are preferably esters of mono-, di- or tricarboxylic acids with long-chain alkanols or polyols, in particular those having a minimum viscosity of 2 mm² at 100° C., as described in particular in DE-A 38 38 918. The mono-, di- or tricarboxylic acids used may be aliphatic or aromatic acids, and particularly suitable ester alcohols or ester polyols are long-chain members having, for example, 6 to 24 carbon atoms. Typical members of the esters are adipates, phthalates, isophthalates, terephthalates and trimellitates of isooctanol, of isononanol, of isodecanol and of isotridecanol. Such products also have carrier oil properties.

Additives containing groups derived from succinic anhydride and having hydroxyl and/or amino and/or amido and/or imido groups (h) are preferably corresponding derivatives of polyisobutenylsuccinic anhydride, which are obtainable by reaction of conventional or highly reactive polyisobutene having an $M_N$ of from 300 to 5000 with maleic anhydride by a thermal method or via the chlorinated polyisobutene. Of particular interest here are derivatives with aliphatic polyamines, such as ethylenediamine, diethylenetriamine, triethylenetetramine or tetraethylenepentamine. Such gasoline fuel additives are described in particular in U.S. Pat. No. 4,849,572.

Additives containing groups produced by Mannich reaction of phenolic hydroxyl groups with aldehydes and mono- or polyamines (i) are preferably reaction products of polyisobutene-substituted phenols with formaldehyde and mono- or polyamines, such as ethylenediamine, diethylenetriamine, triethylenetetramine, tetraethylenepentamine or dimethylaminopropylamine. The polyisobutenyl-substituted phenols can be derived from conventional polyisobutene having an $M_N$>1000. Such polyisobutene Mannich bases are described in particular in EP-A 831 141.

For a more exact definition of the individual gasoline fuel additives mentioned, the disclosures of the abovementioned prior art publications are hereby expressly incorporated by reference.

Suitable solvents or diluents (in the preparation of additive packets) are aliphatic and aromatic hydrocarbons, e.g. solvent naphtha.

Further conventional additive components which can be combined with the novel additives are, for example, corrosion inhibitors, for example based on ammonium salts of organic carboxylic acids, which salts tend to form films, on heterocyclic aromatics, antioxidants or stabilizers, for example based on amines, such as p-phenylenediamine, dicyclohexylamine or derivatives thereof or on phenols, such as 2,4-di-tert-butylphenol or 3,5-di-tert-butyl-4-hydroxyphenylpropionic acid, demulsifiers, antistatic agents, metallocenes, such as ferrocene or methylcyclopentadienylmanganesetricarbonyl, lubricity additives, such as specific fatty acids, alkenylsuccinc esters, bis(hydroxyalkyl)-fatty-amines, hydroxyacetamides or castor oil, and markers. If required, amines are also added for reducing the pH of the fuel.

Carrier oils, too, may be mentioned as further conventional components. Examples of these are mineral carrier oils (base oils), in particular those of the viscosity class solvent neutral (SN) 500 to 2000, synthetic carrier oils based on olefin polymers having an $M_N$ of from 400 to 1800, especially those based on polybutene or on polyisobutene (hydrogenated or unhydrogenated), on poly-alpha-olefins or poly(internal)olefins, and synthetic carrier oils based on alkoxylated long-chain alcohols or phenols. Polyalkenyl alcohol-polyetheramines, as described, for example, in DE-199 16 512.2, are also suitable as further additives.

The present invention furthermore relates to additive concentrates, in particular fuel additive concentrates and lubricant additive concentrates, particularly preferably fuel additive concentrates, containing, in addition to conventional additive components as defined above, at least one novel Mannich adduct in amounts of from 0.1 to 99.9, preferably from 0.5 to 80, in particular from 1.0 to 60, % by weight, based on the total weight of the concentrate.

The present invention furthermore relates to fuel compositions, especially gasoline fuel compositions, which contain the novel Mannich adducts, in particular Mannich adducts of the formula I, in effective amounts. In the case of fuel compositions, effective amounts are to be understood as a rule as meaning from 10 to 5000, in particular from 50 to 2000, ppm by weight, based on the total amount of the fuel composition.

The present invention also relates to lubricant compositions, in particular lubricant compositions which contain from 0.1 to 10, in particular from 0.5 to 5, % by weight, based on the total amount of the lubricant composition, of the novel Mannich adducts, in particular Mannich adducts of the formula Ia and/or Ib.

The novel polyisobutenylphenol-containing Mannich adducts, in particular polyisobutenylphenol-containing Mannich adducts of the formula I, have, as further illustrated in the following experimental section, an excellent action as gasoline fuel detergents which clean valves and keep valves clean. In addition, they do not have the initially described disadvantages of the polyalkylenylphenol Mannich adduct mixtures known from the prior art. Moreover, they have very advantageous viscosity behavior, in particular at low temperatures, which prevents formulation and application problems, e.g. sticking of valves.

EXAMPLES

The alkylation products and the Mannich adducts were characterized by means of ¹H-NMR spectroscopy. For some of the Mannich adducts, only the chemical shifts (δ in ppm) of the characteristic signals of the methylene protons of the aminomethylene group are reported.

I. Preparation of the Polyisobutenylphenols

Ia. Alkylation with a Polyisobutene Having $M_N=550$ 404.3 g of phenol were melted in a nitrogen atmosphere at from 40 to 45° C. in a 4 l four-necked flask. 191 g of $BF_3$-diethyl ether adduct were added dropwise and the mixture was cooled to 10° C. 1100 g of polyisobutene having an $M_N$ of 550 and a dimethylvinylidene content of 85%, dissolved in 1000 ml of hexane, were added dropwise in the course of 150 minutes at from 5 to 10° C. The mixture was allowed to warm up to room temperature in the course of 4 hours and was stirred overnight. The reaction was stopped by adding 1200 ml of 25% strength ammonia solution. The organic phase was separated off and then washed 8 times with 500 ml of water and dried over $NaSO_4$, and the solvent and small amounts of phenol were removed under reduced pressure: 1236 g of oil (polyisobutenylphenol).

$^1$H-NMR: 7.2 ppm (doublet, 2H), 6.7 ppm (doublet, 2H), 4.8 ppm (singlet, 1H), 1.75 ppm (singlet, 2H), 1.5-0.5 ppm (singlets, 78H).

This corresponds to an $M_N$ of 550 for the alkyl radical. The signal range of 7.1-6.75 ppm contains small signals which indicate from 5 to 10% of 2- or 2,4-substituted phenol.

Ib. Alkylation with a Polyisobutene Having $M_N=750$ 119 g of phenol were melted under nitrogen at from 40 to 45° C. in a 2 l four-necked flask. 44.1 g of $BF_3$-diethylether adduct were added dropwise and the mixture was cooled to 20 to 25° C. 465 g of polyisobutene having an $M_N$ of 750 and a dimethylvinylidene content of 85%, dissolved in 1500 ml of hexane, were added dropwise in the course of 3 hours at from 20 to 25° C. Stirring was carried out overnight. The reaction was then stopped by adding 500 ml of 25% strength ammonia solution. The organic phase was separated off and then washed 8 times with 500 ml of water and dried over $NaSO_4$, and the solvent was removed under reduced pressure: 481 g of oil (polyisobutenylphenol).

$^1$H-NMR: 7.2 ppm (doublet, 2H), 6.7 ppm (doublet, 2H), 4.8 ppm (singlet, broad 1H), 1.75 ppm (singlet, 2H), 1.5-0.5 ppm (singlets, 105H).

This corresponds to an $M_N$ of 740 for the alkyl radical.

II. Conversion of the Polyisobutenylphenols into Mannich Adducts

IIa.

319 g of polyisobutenylphenol from Example 1a in 140 ml of toluene were initially taken in a 1 l four-necked flask with a water separator. 16.5 g of paraformaldehyde were added and the mixture was rapidly heated to 110° C. Thereafter, 56.1 g of 3-(dimethylamino)-n-propylamine were added and water was removed (by distillation) in the course of 6 hours. The solution was filtered and the solvent was removed under reduced pressure: 356 g of oil. The oil was washed twice with about 0.5 l of hot methanol each time and was dried under reduced pressure: 263 g of oil (Mannich adduct).

$^1$H-NMR data (see Table 2) indicate the N-(2-hydroxy-5-polyisobutenylbenzyl)-N-(3-dimethylaminopropyl)amine (mono-Mannich adduct) has formed as the main product. Additional signals at 3.7 and 3.5 ppm and the integration of the dimethylaminopropyl protons indicate a low content of N,N-bis(2-hydroxy-5-polyisobutenylbenzyl)-N-(3-dimethylaminopropyl)amine and of N,N-bis(2-hydroxy-5-polyisobutenylphenyl)methane. Overall, the ratio of aromatic to isobutenyl protons corresponds to an Mn of the alkyl radical of 650.

IIb.

233 g of polyisobutenylphenol from Example 1b in 120 ml of toluene were initially taken in a 0.5 l four-necked flask with a water separator. 29 g of 3-(dimethylamino)-n-propylamine are added at 50° C. and 23.4 g of formaldehyde solution (37% strength) were added dropwise and the mixture was heated to 110° C. Water was then removed (by distillation) in the course of 3 hours. The solution was filtered and the solvent was removed under reduced pressure: 254 g of oil (Mannich adduct).

$^1$H-NMR Spectroscopy Data are Summarized in Table 2.

IIc.

260 g of polyisobutenylphenol from Example 1a were initially taken in a 1 l four-necked flask. 12.6 g of paraformaldehyde and 74.8 g of di[3-(dimethylamino)-n-propyl]amine in 100 ml of isopropanol were added dropwise, the temperature increasing to 38° C. Stirring was carried out for a further hour and refluxing for 2 hours. The solution was filtered and the solvent was removed under reduced pressure: 332 g of oil (Mannich adduct).

The $^1$H-NMR spectrum (cf. Table 2) corresponds to an $M_N$ of the alkyl radical of 546.

IId.

320 g of polyisobutenylphenol from Example 1a and 24 g of diethylamine in 140 ml of toluene were initially taken in a 0.5 l four-necked flask with a water separator. 17 g of paraformaldehyde were added at 90° C. in three portions and refluxing was carried out. Water was then removed by distillation in the course of 3 hours. The solution was filtered and the solvent was removed under reduced pressure: 355 g of oil (Mannich adduct).

The $^1$H-NMR spectrum (cf. Table 2) corresponds to an $M_N$ of the alkyl radical of 545.

In the table below (Table 1), the Mannich adducts prepared by the novel process and some important data are summarized. The Mannich adducts IIe to IIm were prepared analogously to a process described for IIa, IIb or IIc.

TABLE 1

| Mannich adduct | Preparation analogous to | Mn[1] alkyl radical | Amine | Batch size PIB-phenol[2] [mol] | Yield g |
|---|---|---|---|---|---|
| IIa | — | 550 | DMAPA[3] | 0.5 | 263 |
| IIb | — | 750 | DMAPA[3] | 0.27 | 254 |
| IIc | — | 550 | DDMAPA[4] | 0.4 | 332 |
| IId | — | 550 | DEA[5] | 0.5 | 355 |
| IIe | IIb | 550 | DMAPA[3] | 0.5 | 359 |
| IIf | IIb | 550 | morpholine | 0.5 | 352 |
| IIg | IIb | 550 | MOEA[6] | 0.5 | 318 |
| IIh | IIb | 550 | MOPA[7] | 0.5 | 360 |
| IIj | IIb | 550 | MPIP[8] | 0.5 | 367 |
| IIk | IIa | 550 | EDA[9] | 0.5 | 331 |
| IIm | IIb | 750 | morpholine | 0.29 | 272 |

[1] Number average molecular weight of the polyisobutene used for the preparation of the polyisobutenylphenol
[2] PIB-phenol is polyisobutenylphenol
[3] 3-(Dimethylamino)-n-propylamine
[4] Di[3-(Dimethylamino)-n-propyl]amine
[5] Diethylamine
[6] 2-Methoxyethylamine
[7] 3-Methoxy-n-propylamine
[8] N-Methylpiperazine
[9] Ethylenediamine

TABLE 2

$^1$H-NMR data of the Mannich adducts IIa to IIm (each entry comprises the signal position in ppm/the splitting pattern/the integral [number of H atoms], cf. legend)

IIa: 7.1/DF/1; 6.9/SF/1; 6.6/D/1; 3.9-3.5/Ss/2.2; 1.8/S/2; 1.5-0.5/Ss/93; 2.7/T/1.2; 2.3/T/1.2; 2.2/S/3.6; 1.7/M/1.2.

TABLE 2-continued $^1$H-NMR data of the Mannich adducts IIa to IIm (each entry comprises the signal position in ppm/the splitting pattern/the integral [number of H atoms], cf. legend)

| | |
|---|---|
| IIb: | 7.0-7.2/DFs/1; 7-6.8/SFs/1; 6.5-6.6/Ds/1; 3.9-3.5/Ss/2; 1.8/S/2; 1.5-0.5/Ss/107; 2.7/T/1.2; 2.3/T/1.2; 2.2/S/3.6 |
| IIc: | 7.1/DF/1; 6.9/SF/1; 6.6/D/1; 3.7/S/2; 1.8/S/2; 1.5-0.5/Ss/71; 2.7/T/3.9; 2.3/T/3.9; 2.2/S/11; 1.7/M/4 |
| IId: | 7.1/DF/1; 6.9/SF/1; 6.6/D/1; 3.7/S/2; 1.8/S/2; 1.5-0.5/Ss/77; 2.6/Q/3.9; 1.1/T/6 (?) |
| IIe: | 7.0-7.2/DFs/1; 7-6.8/SFs/1; 6.5-6.6/Ds/1; 3.9-3.5/Ss/2; 1.8/S/2; 1.5-0.5/Ss/73; 2.7/T/1.3; 2.3/T/1.3; 2.2/S/3.8; 1.7/M/1.3 |
| IIf: | 7.1/DF/1; 6.9/SF/1; 6.6/D/1; 3.7/S/2; 1.8/Ss/2; 1.5-0.5/Ss/76; 3.7/M/4; 2.5/M/4 |
| IIg: | 6.9-'7.2/DFs/1; 6.8-7/SFs/1; 6.5-6.7/Ds/1; 3.9-3.7/Ss/2; 1.8/S/2; 1.5-0.5/Ss/80; 3.5/Ts/2; 3.3-2.4/Ss/3; 2.6-2.8/Ts/2 |
| IIh: | 7.1/DF/1; 6.9/SF/1; 6.6/D/1; 3.9-3.6/Ss/2; 1.8/S/2; 1.5-0.5/Ss/75; 3.4/T/2; 3.2-2.3/Ss/3; 2.5-2.7/Ts/2; 2.9/M/2 |
| IIj: | 7.1/DF/1; 6.9/SF/1; 6.6/D/1; 3.7/S/2; 1.8/S/2; 1.5-0.5/Ss/77; 2.5/M/8; 2.2/S/3 |
| IIk: | 7.1/DFs/1; 6.9/SFs/1; 6.6/Ds/1; 3.9-3.6/Ss/2; 1.8/S/2; 1.5-0.5/Ss/78; 2.6-2.9/M/4 |
| IIm: | 7.2/DF/1; 6.9/SF/1; 6.6/D/1; 3.75/S/2; 1.8/S/2; 1.5-0.5/Ss/100; 3.7/M/4; 2.5/M/4 |

D = Doublet
DF = Doublet, fine structure
S = Singlet
SF = Singlet, fine structure
T = Triplet
Q = Quartet
M = Multiplet
Index s = plurality of signals of the same type added, 0.35 mol of formaldehyde in the form of 37% formalin solution was added dropwise at 50° C. under nitrogen as protective gas. The reaction mixture was then heated to solvent reflux and water removed by distillation for 3 hours. The solution was filtered and the solvent removed under reduced pressure: 136 g of oil (Mannich adduct).

III. Column Chromatographic Fractionation of the Mannich Adducts

The oil from Example 11b was separated over a silica gel column (length: 100 cm, diameter 5 cm). First, unconverted polyisobutenylphenol was eluted with toluene, after which any 2,2'-dihydroxy-5,5'-dipolyisobutenyldiphenylmethane formed can be eluted. Amine-containing derivatives were eluted with isopropanol/25% strength aqueous ammonia solution (95/5, v/v).

$^1$H-NMR:

a) 2,2'-Dihydroxy-5,5'-dipolyisobutenyldiphenylmethane $^1$H-NMR: 7.1 ppm (doublet, fine structure, 2H), 6.9 ppm (singlet, fine structure, 2H), 6.7 ppm (doublet, 2H), 3.5 ppm (singlet, 2H), 1.75 ppm (singlet, 4H), 1.5-0.5 ppm (singlets, 156H)

b) N-3-(Dimethylaminopropyl)-N-(2-hydroxy-5-polyisobutenylbenzyl)amine $^1$H-NMR: 7.1 ppm (doublet, fine structure, 1H), 6.9 ppm (singlet, fine structure, 1H), 6.7 ppm (doublet, 1H), 3.5 ppm (singlet, 2H), 2.5 ppm (triplet, 2H), 2.2 ppm (triplet, 2H), 2.1

TABLE 3

| Example No. | $M_n$ Polyisobutenyl radical | Amine | PIB-phenol [6) [mol] | Amine [mol] | Formaldehyde [mol] | Yield [g] | δ of aminomethylene protons [ppm] |
|---|---|---|---|---|---|---|---|
| 1 [1)] | 550 | DEOHA [2)] | 0.167 | 0.33 | 0.35 | 136 | 3.7 |
| 2 | 750 | DMAPA [3)] | 0.27 | 0.29 | 0.29 | 254 | 3.9 |
| 3 | 250 | DETA [4)] | 0.43 | 1.03 | 0.95 | 260 | 3.9 + 3.75 |
| 4 | 550 | DMA [5)] | 0.39 | 0.5 | 0.47 | 266 | 3.6 |
| 5 | 700 | DMA | 0.44 | 0.57 | 0.53 | 369 | 3.6 |
| 5a | 700 [7)] | DMA | 0.41 | 0.45 | 0.45 | 360 | 3.6 |
| 5b | 700 [8)] | DMA | 0.38 | 0.41 | 0.41 | 319 | 3.6 |
| 5c | 700 [9)] | DMA | 0.43 | 0.47 | 0.47 | 366 | 3.6 |
| 6 | 700 | DEOHA | 0.43 | 0.47 | 0.47 | 366 | 3.6 |
| 7 [1)] | 224 | DEOHA | 0.25 | 0.8 | 0.9 | 166 | 3.7 |
| 8 [1)] | 224 | DEOHA | 0.25 | 0.27 | 0.3 | 106 | 3.75 |

[1)] Paraformaldehyde was used instead of 37% formaldehyde solution
[2)] Diethanolamine
[3)] Dimethylaminopropylamine
[4)] Diethylamine
[5)] Dimethylamine
[6)] Polyisobutenylphenol
[7)] Feed polyisobutene (PIB) from mixing PIB $M_n$ = 550 and PIB $M_n$ = 1000
[8)] Feed polyisobutene by refining
[9)] Feed polyisobutene by direct synthesis The examples of Table 3 above were prepared similarly to the following preparative method for Example 1:

Example 1

A 0.5 l four-necked flask equipped with water separator was charged with 0.167 mol of PIB-phenol of Example 1a in 200 ml of toluene. After 0.33 mol of diethanolamine had been ppm (singlet, 6H), 1.75 ppm (singlet, 2H), 1.7 ppm (multiplet, 4H), 1.5-0.5 ppm (singlets, 75H)

c) N-3-(Dimethylaminopropyl)-N,N-bis(2-hydroxy-5-polyisobutenylbenzyl)amine $^1$H-NMR: 7.1 ppm (doublet, fine structure, 2H), 6.9 ppm (singlet, fine structure, 2H), 6.7 ppm (doublet, 2H), 3.75 ppm (singlet, 4H), 2.5 ppm (triplet, 2H), 2.2 ppm (triplet, 2H), 2.1 ppm (singlet, 6H), 1.75 ppm (singlet, 4H), 1.7 ppm (multiplet, 4H), 1.5-0.5 ppm (singlets, 78H)

IV. Testing of the Performance Characteristics

The lubricant used below was in each case reference oil RL 189/5.

IVa.

The intake valve cleanliness was tested by CEC method F-05-A-93 in an Opel Kadett engine. Commercial European premium grade base fuel according to EN 228, to which either no fuel additive (Comparative Example 1) or fuel additives not according to the invention and based on Mannich adducts (Comparative Examples 2 and 3) or a novel polyisobutenylphenol-containing Mannich adduct (Example 1) had been added, was used for this purpose.

The fuel additive not according to the invention and from Comparative Example 2 was prepared according to Comparative Example 2 of EP-A-0 831 141.

The novel polyisobutenylphenol-containing Mannich adduct was prepared according to Ia and IIa.

The most important parameters, the dosage and the performance results, are summarized in Table 4.

IVb

The intake valve cleanliness was tested by CEC method F-04-A-87 in a Mercedes Benz M 102 E engine using a commercial European premium grade base fuel according to EN 228 either without fuel additive (Comparative Example 3) or with a fuel additive mixture comprising 40% by weight of a synthetic carrier oil (based on a polybutoxylated fatty alcohol) and 60% by weight of a noninventive fuel additive (Comparative Example 4) or with inventive polyisobutenephenol Mannich adducts (Examples 2 to 4). The additive was used in the form of a 50% by weight solution in a $C_{10}$-$C_{13}$-paraffin.

The noninventive fuel additive used was a polyisobutenylamine obtainable by hydroformylation and subsequent reductive amination of a polyisobutene.

Some parameters of the additives used, the dosage and the performance results are summarized in Table 5.

TABLE 5

| Example No. | $M_n$[1] | Amine | Dosage [mg/kg] | Δ IVD[2] [mg/valve] |
|---|---|---|---|---|
| Comp. 3 | — | — | 200 | 151 |
| Comp. 4 | — | $NH_3$ | 200 | 64 |
| Inv. 2[4] | 700 | DMA[3] | 200 | 52 |
| Inv. 3[5] | 700 | DMA | 200 | 22 |
| Inv. 4[6] | 700 | DMA | 200 | 43 |

[1]Number average molecular weight of polyisobutenyl radical
[2]IVD = intake valve deposits; mean of deposits on all valves
[3]Dimethylamine
[4]Phenol alkylated using a highly reactive PIB having a number average molecular weight of 700.
[5]Alkylation carried out using a mixture of high purity polyisobutenes having number average molecular weights of 550 and 1000 for the individual components. The number average molecular weight of the mixture was 700.
[6]From a Mannich adduct mixture obtained from high purity PIB having a number average molecular weight of 1000, phenol and DMA a fraction was extracted whose polyisobutenyl radical had a number average molecular weight of 700.

TABLE 4

| | $M_N$[1] | Amine | Dosage [mg/kg] | Valve deposits [mg/valve] | | | | Mean value[2] |
|---|---|---|---|---|---|---|---|---|
| | | | | 1 | 2 | 3 | 4 | |
| Comp. 1 | — | — | — | 450 | 188 | 316 | 366 | 330 |
| Comp. 2 | 1000 | EDA[3] | 400 | 9 | 127 | 7 | 193 | 84 |
| Inv. 1 | 550 | DMAPA[4] | 400 | 0 | 1 | 0 | 0 | 0.25 |

[1]Number average molecular weight of the polyisobutenyl radical
[2]Mean value of the deposits from the four valves
[3]Ethylenediamine
[4]3-(Dimethylamino)-n-propylamine

We claim:

1. A process for the preparation of polyisobutenylphenol-containing Mannich adducts, comprising:
    a) alkylating a phenol with a highly reactive polyisobutene having a vinylidene double bond content of more than 70 mol %, a number average molecular weight of less than 900, and a polydispersity of less than 3.0 at below about 50° C., wherein the alkylating is carried out in the presence of an alkylation catalyst to form a reaction product; and
    b) reacting the reaction product from a) with
        b1) at least one aldehyde selected from the group consisting of formaldehyde, an oligomer of formaldehyde and a polymer of formaldehyde, and
        b2) at least one amine of the formula $NHR^4R^5$ where $R^4$ and $R^5$ are $C_1$- to $C_{20}$ alkyl radicals.

2. The process as claimed in claim 1, wherein the amine reacted with the reaction product is at least one selected from the group consisting of dimethylamine and diethylamine.

3. The process as claimed in claim 1, wherein the reacting is carried out to form an adduct mixture comprising at least 40 mol % of at least one compound selected from the group consisting of formula (Ia) and (Ib),

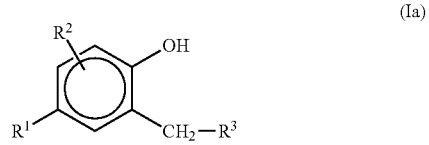

(Ia)

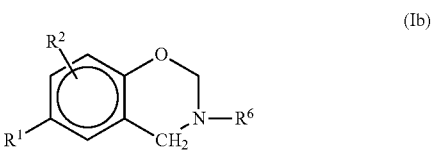

(Ib)

wherein $R^1$ is a terminally bonded polyisobutenyl radical, $R^2$ is H, $C_1$- to $C_{20}$-alkyl, $C_1$- to $C_{20}$-alkoxy, hydroxyl, a polyalkylenyl radical or $CH_2NR^4R^5$, where $R^4$ and $R^5$ have the meanings stated below, and $R^3$ is $NR^4R^5$, where $R^4$ and $R^5$, independently of one another, are selected from the groups consisting of $C_1$- to $C_{20}$-alkyl radicals and phenol radicals of the formula II

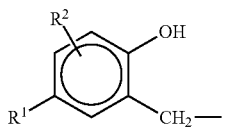

(II)

where $R^1$ and $R^2$ are as defined above;
with the proviso that $R^4$ and $R^5$ are not simultaneously phenol radicals of the formula II; or $R^4$ and $R^5$, together with the N atom to which they are bonded, form a 5-, 6- or 7-membered cyclic structure which has one or two heteroatoms selected from the group consisting of N and O and may be substituted by one, two or three $C_1$- to $C_6$-alkyl radicals; and
$R^6$ is a radical $R^4$ or $R^5$.

4. The process as claimed in claim 1, wherein the reacting is carried out to form an adduct having a polydispersity of from 1.1 to 3.5.

5. The process as claimed in claim 4, further comprising:
fractionating the reaction mixture from b) by column chromatography over an acidic stationary phase by multistage elution with
at least one hydrocarbon, and then
at least one basic alcohol/water mixture.

6. The process as claimed in claim 5, wherein the basic alcohol/water mixture comprises:
a) from 75-99.5% by weight of at least one $C_2$- to $C_4$-alcohol,
b) from 0.4-24.4% by weight of water, and
c) from 0.1-15% by weight of at least one amine which is volatile at room temperature.

7. The process as claimed in claim 1, wherein the reacting is carried out to form an adduct mixture comprising up to 20 mol % of one or more polyisobutenyl phenols formed by the alkylating and which are not reacted in the reacting.

8. The process as claimed in claim 1, wherein the reacting is carried out to form an adduct mixture comprising from 1-15 mol % of one or more polyisobutenyl phenols formed by the alkylating and which are not reacted in the reacting.

9. A Mannich adduct obtained by the process as claimed in claim 1.

10. A Mannich adduct obtained by the process as claimed in claim 3, wherein the Mannich adduct comprises at least 40 mol % of one or more compounds of formula Ia and Ib.

11. A fuel and/or lubricant composition comprising a detergent effective amount of the Mannich adduct claimed in claim 9.

12. An additive concentrate, comprising:
one or more conventional additive components, and at least one Mannich adduct as claimed in claim 9 in an amount of from 0.1 to 99% by weight.

13. An additive concentrate, comprising:
one or more conventional additive components, and
at least one Mannich adduct claimed in claim 9 in an amount of from 0.5 to 80% by weight.

14. A fuel composition, comprising:
a major amount of at least one liquid hydrocarbon fuel, and
at least one adduct as claimed in claim 9 in a detergent active effective amount.

15. A lubricant composition, comprising:
a major amount of at least one of a liquid lubricant, a semisolid lubricant and a solid lubricant, and
at least one adduct as claimed in claim 9 in a detergent active effective amount.

16. A gasoline or diesel fuel, comprising:
the fuel composition claimed in claim 14.

17. The process as claimed in claim 1, wherein R1 has a number average molecular weight of from 300 to 850.

18. The process as claimed in claim 3, wherein $R^3$ is $NR^4R^5$ wherein $R^4$ and $R^5$, independently of one another, are $C_1$- to $C_{20}$-alkyl radicals.

19. A process for the preparation of polyisobutenylphenol-containing Mannich adducts, comprising:
a) alkylating a phenol with a highly reactive polyisobutene having a vinylidene double bond content of more than 70 mol %, a number average molecular weight of less than 900, and a polydispersity of less than 3.0 at below about 50° C., wherein the alkylating is carried out in the presence of an alkylation catalyst to form a reaction product; and
b) reacting the reaction product from a) with
b1) at least one aldehyde selected from the group consisting of formaldehyde, an oligomer of formaldehyde and a polymer of formaldehyde, and
b2) at least one amine of the formula $NHR^4R^5$ where $R^4$ and $R^5$ are H or $C_1$- to $C_{20}$ alkyl radicals, to form an adduct mixture comprising at least at least one compound of formula (Ib)

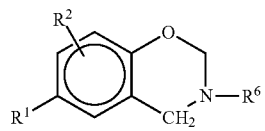

(Ib)

wherein
$R^1$ is a terminally bonded polyisobutenyl radical;
$R^2$ is H, $C_1$- to $C_{20}$-alkyl, $C_1$- to $C_{20}$-alkoxy, hydroxyl, a polyalkylenyl radical or $CH_2NR^4R^5$, where $R^4$ and $R^5$, independently of one another, are selected from the groups consisting of hydrogen, $C_1$- to $C_{20}$-alkyl radicals and phenol radicals of the formula II

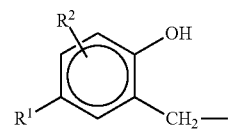

(II)

with the proviso that $R^4$ and $R^5$ are not simultaneously H or phenol radicals of the formula II; or $R^4$ and $R^5$, together with the N atom to which they are bonded, form a 5-, 6- or 7-membered cyclic structure which has one or two heteroatoms selected from the group consisting of N and O and may be substituted by one, two or three $C_1$- to $C_6$-alkyl radicals; and
$R^6$ is a radical $R^4$ or $R^5$ other than H.

20. The process as claimed in claim 19, wherein the amine reacted with the reaction product is at least one selected from the group consisting of dimethylamine and diethylamine.

21. The process as claimed in claim 19, wherein the reacting is carried out to form an adduct mixture comprising at least 40 mol % of the compound of formula (Ib).

22. The process as claimed in claim 19, wherein the reacting is carried out to form an adduct having a polydispersity of from 1.1 to 3.5.

23. The process as claimed in claim 19, wherein the reacting is carried out to form an adduct mixture comprising up to 20 mol % of one or more polyisobutenyl phenols formed by the alkylating and which are not reacted in the reacting.

24. The process as claimed in claim 19, wherein the reacting is carried out to form an adduct mixture comprising from 1-15 mol % of one or more polyisobutenyl phenols formed by the alkylating and which are not reacted in the reacting.

25. A Mannich adduct obtained by the process as claimed in claim 19.

26. A fuel and/or lubricant composition comprising a detergent effective amount of the Mannich adduct claimed in claim 25.

27. An additive concentrate, comprising:
one or more conventional additive components, and at least one Mannich adduct as claimed in claim 25 in an amount of from 0.1 to 99% by weight.

28. An additive concentrate, comprising:
one or more conventional additive components, and
at least one Mannich adduct claimed in claim 25 in an amount of from 0.5 to 80% by weight.

29. The process according to claim 19, wherein $R^2$ is at least one of H and hydroxyl.

30. The process according to claim 19, wherein $R^2$ is at least one of a $C_1$- to $C_{20}$-alkyl group, a $C_1$- to $C_{20}$-alkoxy group and a polyalkylenyl radical.

31. The process as claimed in claim 1, wherein the highly reactive polyisobutene has a uniform polymer backbone of at least 95% by weight isobutene units.

32. The process according to claim 1, wherein the reaction product formed in step (a) is a phenol substituted with a polyisobutene group having a number average molecular weight of less than 750.

33. The process according to claim 1, further comprising:
mixing the polyisobutenyl phenol-containing Mannich adduct with a gasoline fuel to form a composition that is free of polyolefin polymers.

34. The process according to claim 1, wherein the amine is a monoamine.

35. The process according to claim 1, further comprising:
fractionating the reaction mixture formed in step (b).

36. The process as claimed in claim 19, wherein the highly reactive polyisobutene has a uniform polymer backbone of at least 95% by weight of isobutene.

37. The process according to claim 19, wherein the reaction product formed in step (a) is a phenol substituted with a polyisobutene group having a number average molecular weight of less than 750.

38. The process according to claim 19, further comprising:
mixing the polyisobutenyl phenol-containing Mannich adduct with a gasoline fuel to form a composition that is free of polyolefin polymers.

39. The process according to claim 19, wherein the amine is a monoamine.

40. The process according to claim 19, further comprising:
fractionating the reaction mixture formed in step (b).

41. The process according to claim 1, wherein the highly reactive polyisobutene has a polydispersity of from 2.5 to less than 3.0.

42. The process according to claim 19, wherein the highly reactive polyisobutene has a polydispersity of from 2.5 to less than 3.0.

\* \* \* \* \*